United States Patent [19]

Ohlson

[11] 4,187,698
[45] Feb. 12, 1980

[54] COUPLING FOR MISALIGNED SHAFTS

[76] Inventor: John F. Ohlson, 48 Judie La., Ambler, Pa. 19002

[21] Appl. No.: 914,311

[22] Filed: Jun. 12, 1978

[51] Int. Cl.² ............................ F16D 3/18; F16D 3/54
[52] U.S. Cl. ........................................ 64/9 R; 64/21; 64/28 R
[58] Field of Search ................................ 64/9 R, 7, 21

[56] References Cited

U.S. PATENT DOCUMENTS

| 477,625 | 6/1892 | Detrick | 64/9 R |
| 1,265,889 | 5/1918 | Ecaubert | 64/9 R |
| 2,551,735 | 5/1951 | Goff | 64/9 R |
| 3,760,605 | 9/1973 | Schroder | 64/9 R |
| 4,003,218 | 1/1977 | Filderman | 64/9 R |
| 4,018,062 | 4/1977 | Bulliot | 64/9 R |

FOREIGN PATENT DOCUMENTS

| 348562 | 2/1922 | Fed. Rep. of Germany | 64/9 R |
| 578287 | 6/1946 | United Kingdom | 64/9 R |

OTHER PUBLICATIONS

Rothi, *Eutectic Drive Shafts for DC-10 Hydraulic Pumps*, Douglas paper 6304, Douglas Aircraft Co., published 10/10/1974.

*Primary Examiner*—Ronald H. Lazarus
*Assistant Examiner*—R. C. Turner
*Attorney, Agent, or Firm*—R. S. Sciascia; Henry Hansen

[57] ABSTRACT

A coupling device for torque transmission in non-aligned shafts. Mating splined halves having engaging teeth and a spherical surface at the interface thereof to accommodate misalignment of interconnected shafts. The halves are maintained in engagement by a nut and bolt longitudinally extending through the halves with a spring washer.

10 Claims, 2 Drawing Figures

COUPLING FOR MISALIGNED SHAFTS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to torque transmission and more particularly to an improved shaft coupling having a spherically-formed interface and engaging teeth to accommodate misalignment of interconnected shafts during transmission.

In power transmission systems, particularly aboard aircraft, the transfer of torque from a driving unit to an accessory component often requires use of an intermediate member to interconnect them and transfer rotary motion therebetween. Rigid one-piece members having external longitudinal splines have been used as torque couplers and generally perform well as long as alignment is maintained between the shafts of the driver and driven units. When misalignment of the shafts occurs, however, a severe load burden is placed on the drive unit resulting in costly problems of repair and replacement.

Existing splined couplings do not adequately resolve all of the problems caused in power transmission systems by the relative misalignment of shaft members. Although these couplings have generally been effective in reducing the load burden placed upon drive units when misalignment occurs, they have not been entirely satisfactory in reducing spline wear, a cause for expensive replacement and maintenance actions, particularly in the drive unit. Furthermore, existing concepts of flexible couplings have not had universal application in power transmission systems, but rather have been restricted by geometric and space limitations and torque requirements of the system.

Accordingly, a coupling that transmits torque unaffected by relative misalignment of interconnected shafts is of prime importance to effective operation of power transmission systems, and particularly, to aircraft operations and safety.

SUMMARY OF THE INVENTION

Accordingly, it is the general purpose and object of the present invention to provide a torque coupling device for transferring rotary motion between shafts within a power transmission system with improved capability for accommodating shaft misalignment.

Another object of the present invention is to provide coupling that transmits torque between rotating members of a power transmission system with a reduction in the vibrations and mechanical wear of the system due to relative misalignment of the members.

A further object of the present invention is to provide a shaft coupling that is readily adapted to and easily installed in existing power transmission system, particularly those aboard aircraft.

Still another object of the present invention is to provide an articulate interface for a power transmission system that is equally effective regardless of space limitations and torque requirements of the system.

A still further object of the present invention is to provide an interface spline for misaligned rotating members that is durable in structure and economic to manufacture.

Briefly, these and other objects of the present invention are accomplished by a coupling device comprising mating splined halves having engaging teeth and a spherical boss and cavity formed at the interface thereof. The halves transmit torque between and permit misalignment of, interconnected rotating shafts of a power transmission system. The halves are counterbored and maintained in contact with each other by a nut and bolt engaged longitudinally therethrough and preloaded by a spring washer. The washer also permits angular movement between the bolt and the bore of the halves as the halves respond to misalignment of the shafts at the interface.

For a better understanding of these and other aspects of the invention, reference may be made to the following detailed description taken in conjunction with the accompanying drawing.

DESCRIPTION OF THE PREFERRED EMBODIMENT

Figure 1:
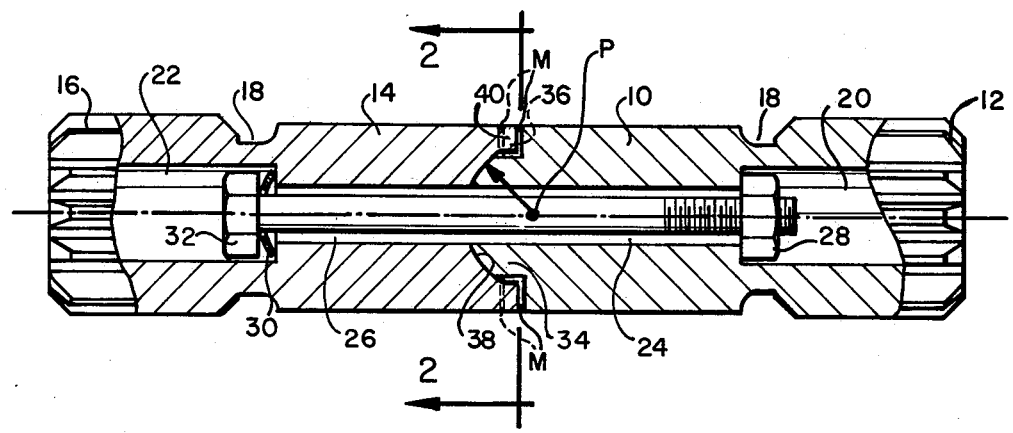
FIG. 1 represents a longitudinal view, partly in cross-section, of a preferred embodiment of a shaft coupling according to the invention.
Figure 2:
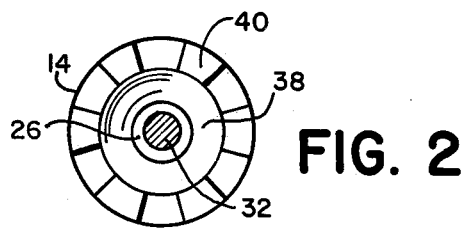
FIG. 2 is an end view of one half of the coupling of FIG. 1 taken on the line 2—2.

Referring now to the drawing, wherein like reference characters designate like or corresponding parts throughout the separate views, there is shown in FIGS. 1 and 2 a pair of cylindrically-shaped members 10 and 14 having external splines 12 and 16 respectively formed around the distal ends thereof. Both splines 12 and 16 are formed to fit into mating internally-splined rotating members of a drive unit and an accessory component (not shown) to permit torque transfer therebetween in the power transmission system. A shear section 18 is located on each of members 12 and 14 to protect the drive unit should failure or lock-up of the driven accessory occur.

Members 10 and 14 are formed from a rigid high-strength material having a sufficiently high shear strength to satisfy the particular torque requirements of the power transmission system. A wear resistant coating (not shown), such as a dry film lubricant, is applied to the mating surfaces of members 10 and 14 to reduce interface wear and extend the life of the coupling.

Members 10 and 14 have coaxial bores 24 and 26 with enlarged bores 20 and 22, longitudinally extending from the distal ends thereof for a length approximately equal to the length of the external splines 12 and 16. The diameters of enlarged bores 20 and 22 are of sufficient size to permit free passage therethrough of nut 28, spring washer 30, and the head of bolt 32. Bores 24 and 26 longitudinally extend from the respective mating surfaces of members 10 and 14, and are of sufficient diameter to permit free passage therethrough of the threaded stem of bolt 32.

The mating surface of member 10 is formed having a spherical boss 34 projecting therefrom and a plurality of axial gear teeth 36 encircling the boss. Boss 34 has its spherical center at point P which is located on the cylindrical axis of member 10 and which becomes the point of flexure of members 10 and 14 when engaged.

The mating surface of member 14 is formed having a spherical cavity 38 with its center also at point P so that the cavity conforms in configuration to that of boss 34. A set of axial gear teeth 40 about cavity 38 intermesh with gear teeth 36 when boss 34 is seated in cavity 38.

When members 10 and 14 are engaged, boss 34 and cavity 38 slidingly interact along their spherical interface thereby permitting the engaged members to pivot about point P in response to a relative misalignment between the coupled rotating members of the drive unit and accessory component. Any misalignment occuring between the coupled rotating members is transmitted through members 10 and 14 and responded to by the sliding interaction of boss 34 and cavity 38.

The intermeshed gear teeth 36 and 40 provide means for transmitting rotary motion between mated members 10 and 14. A spatial clearance M between each face and corresponding root of the intermeshed teeth 36 and 40 allows maximum pivotal movement between mated members 10 and 14 while permitting continued torque transfer between the members during the misalignment response of boss 34 and cavity 38.

Engagement of members 10 and 14 is maintained by bolt 32 and nut 28 which are preloaded by a spring washer 30, such as a belville washer. The threaded stem of bolt 32 extends through bores 24 and 26 to permit threaded engagement therewith by nut 28. It should be noted that the diameter of the stem of bolt 32 is sufficiently less than the diameter of bores 24 and 26 so as not to restrict the sliding interaction of spherical boss 34 and cavity 38 during the misalignment response of the coupling.

Spring washer 30 maintains a steady axial load on mated members 10 and 14 to prevent disengagement thereof due to vibrations and to increase the fatigue life of the structural parts. Washer 30 also permits angular movement of the stem of bolt 32 in bores 24 and 26 as members 10 and 14 respond to misalignment.

Therefore, it is apparent that the disclosed coupling device for transmitting torque in a power transmission system provides an improved capability for accommodating shaft misalignment that reduces vibrations and mechanical wear in the system. In addition, the present invention provides a torque coupling that is readily adapted to and easily installed in existing power transmission systems. Furthermore, the disclosed coupling for misaligned shafts is durable in structure and can be easily and inexpensively manufactured.

Obviously, other embodiments and modifications of the present invention will readily come to those of ordinary skill in the art having the benefit of the teachings presented in the foregoing description and drawings. It is therefor to be understood that, within the scope of the appended claims, the invention may be practiced otherwise than as specifically described.

What is claimed is:

1. A coupling device for transmitting torque along the axes of rotation of a drive unit and a load respectively, comprising:
   a pair of longitudinal members having mating proximal ends and formed to be connected respectively at the distal ends thereof to the drive unit and the load, and having mating spherical surfaces on the respective proximal ends thereof surrounded by a plurality of intermeshing axial teeth; and
   urging means extending along the axes of said members and yieldingly connected therein for axially forcing said surfaces into sliding contact.

2. A coupling device according to claim 1 wherein said urging means comprises:
   rod means connected at one end thereof to one of said members and axially extending therethrough into the other of said members; and
   annular spring means coaxially juxtaposed between the other end of said rod means and said other member for providing an axial force upon said mated members.

3. A coupling device according to claim 2 wherein:
   said longitudinal members having a central bore coaxially extending from each of the respective proximal ends thereof and having an enlarged bore coaxially extending from each of the respective distal ends thereof to form a shoulder within each of said members; and
   said rod means including a rod having a flange on each end thereof to abut against the shoulder in each of said members, at least one of the flanges being adjustable along the length of said rod.

4. A coupling device according to claim 3 wherein said annular spring means comprises:
   an annular spring coaxially positioned along said rod so that said spring is compressed between one of the flanges and the respective shoulder of one of said members.

5. A coupling device according to claim 4 wherein:
   said central bore being of a diameter sufficiently larger than the diameter of said rod to permit unrestricted sliding contact along said mating spherical surfaces.

6. A coupling device according to claim 5 wherein the respective distal ends of said members are provided with a plurality of longitudinal splines.

7. A coupling device for transmitting torque along the axes of rotation of a drive unit and a load respectively, comprising:
   a pair of cylindrical members having mating proximal ends and formed to be connected respectively at the distal ends thereof to the drive unit and the load, one of the proximal ends having a spherical boss projecting centrally therefrom and a first plurality of axial teeth encircling the boss, the other of the proximal ends having a corresponding spherical cavity centrally located thereon and a second plurality of axial teeth encircling the cavity for intermeshing with the first plurality of teeth; and
   urging means extending along the longitudinal axes of said pair of cylindrical members and yieldingly connected therein for axially forcing said members into mated contact.

8. A coupling device according to claim 7 wherein said urging means comprises:
   a rod extending longitudinally within said cylindrical members through respective openings in the proximal ends thereof; and
   spring means coaxially connected at the ends of said rod and juxtaposed to said cylindrical members for axially forcing the proximal ends of said cylindrical members into sliding contact along the corresponding spherical boss and cavity.

9. A coupling device according to claim 7 wherein the first and second plurality of axial teeth intermesh having a spatial clearance between each root and corresponding face of the teeth.

10. A coupling device according to claim 9 wherein the distal ends of said cylindrical members have a plurality of longitudinal splines on the respective surfaces thereof.

* * * * *